June 23, 1942.   S. KROLL ET AL   2,287,314
RUNNING GEAR FOR COLLAPSIBLE CARRIAGES
Filed Dec. 6, 1940
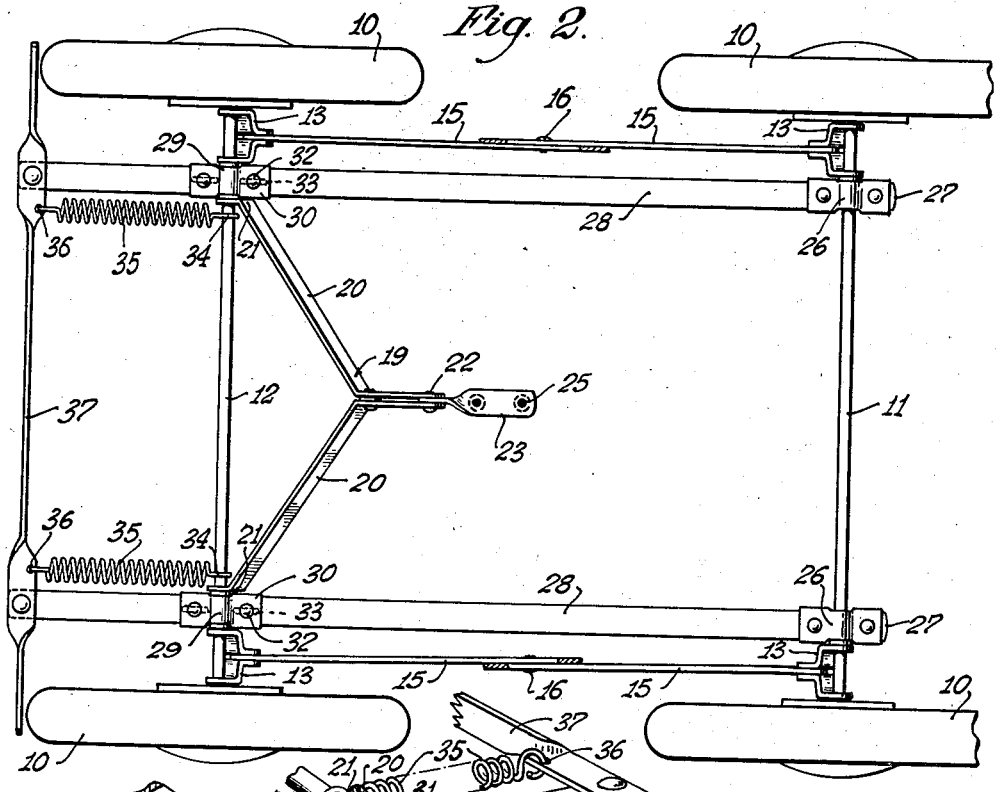
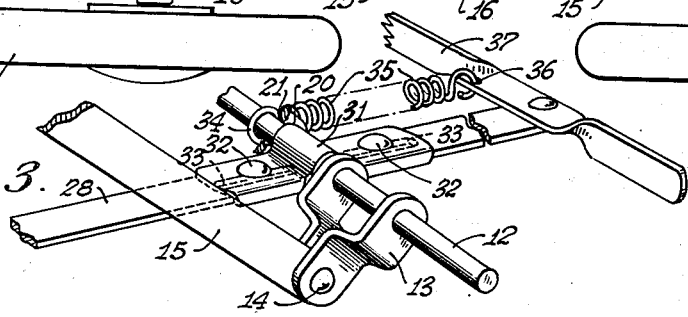
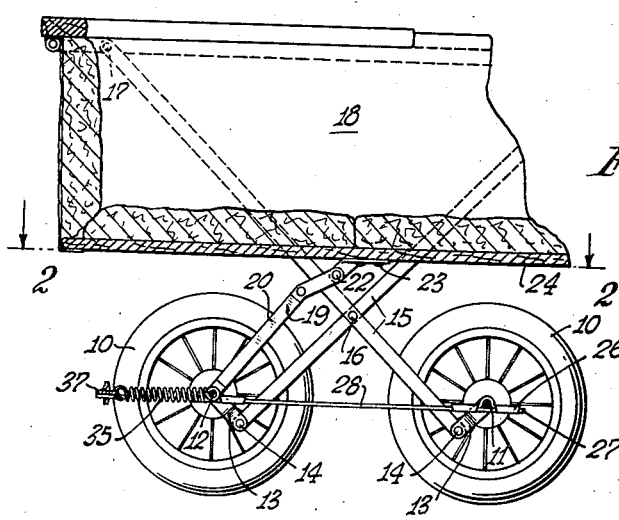
Samuel Kroll
and Nathan J. Kroll
INVENTORS.
By Clarence E. Threedy
THEIR ATTORNEY.

Patented June 23, 1942

2,287,314

UNITED STATES PATENT OFFICE 2,287,314

RUNNING GEAR FOR COLLAPSIBLE CARRIAGES

Samuel Kroll and Nathan J. Kroll, Chicago, Ill.

Application December 6, 1940, Serial No. 368,754

3 Claims. (Cl. 280—47)

This invention relates to certain novel improvements in baby carriages and more particularly to the running gear or chassis thereof, and has for its principal object the provision of an improved construction of this character which will be highly efficient in use and economical in manufacture.

In connection with the running gear or chassis with which we are familiar and which have been in general use prior to our invention, the scissors frame structure of a collapsible carriage has the lower end portions of the scissors bars pivoted to rigid shackles in turn carried by the axles of the running gear or chassis, and these axles are in turn held in their spaced parallel relation with respect to each other through bearings fixed to the side chassis bars of the chassis. In such a structure when the weight of a body, be it that of the attendant leaning upon the carriage body or the weight of the baby or child in the carriage, is imposed upon the carriage body, this weight is transmitted through the scissors bars to the shackles and thence to the axles, and in view of the fact that the axles are in fixed relation with respect to each other, undue bending action is imposed upon the scissors bars and the side bars of the chassis to the extent that either the side bars or the scissors bars are caused to buckle. From the very nature of the material from which these parts are made, we have found that upon buckling these parts generally do not resume their original condition, and as a result the wheels of the carriage are thrown out of alignment and the easy springy action allowed the baby carriage is interfered with to a great degree.

It is therefore one of the many objects of this invention to associate these parts of a carriage in a manner such that this undue strain and weight transposed to these parts are resisted and compensated for, thereby preventing distortion or rupturing of these parts by virtue of undue weight disposed thereon. In other words, one of the salient objects of this invention may be explained by briefly stating that as the weight of the child increases, the relationship between these parts of the baby carriage is such as to compensate for this increased weight.

A still further object of the invention is to arrange the carriage parts together to accomplish the hereinbefore-stated objects withtout interfering with or lessening the rocking and springing action of the carriage.

As a matter of fact, one of the objects of this invention is to arrange the parts in such manner that the rocking and springing action of the carriage is permitted with the greatest degree of efficiency.

Other objects will appear hereinafter.

The invention consists in the novel combination and arrangement of parts to be hereinafter described and claimed.

The invention will be best understood by reference to the accompanying drawing showing the preferred form of construction, and in which:

Fig. 1 is a fragmentary vertical sectional detail view of a carriage illustrating our invention associated therewith;

Fig. 2 is a plan view of the same taken substantially on line 2—2 of Fig. 1;

Fig. 3 is a perspective view of the axle and side-chassis-bar mounting embodied in my invention.

The drawing accompanying this application illustrates the preferred form of structure of our invention. In this connection, 10 indicates the wheels of the carriage. These wheels are mounted upon the opposite ends of axles 11 and 12.

Pivotally carried by these axles 12, preferably adjacent the inner faces of the wheels 10 are shackle members 13. Pivotally connected as at 14 to these shackles 13 are the lower end portions of the scissors bars 15—15 arranged in pairs and pivotally connected intermediate their end portions as at 16, with their upper end portions pivotally connected as at 17 to the carriage body 18.

A stabilizing device is indicated at 19 and includes bar members 20, the ends of which are connected to the axle 12 as at 21. The upper ends of these bars 19 are pivotally connected as at 22 to an attaching bracket 23 connected to the bottom 24 of the carriage body 18, as at 25.

The axle 11 is journaled through fixed bearings 26 connected to the opposite corresponding end portions 27 of side chassis bars 28. The axle 12 is journaled in bearings 29 adjustably carried by the chassis side bars 28. Each of these bearings comprises a bearing cap 30, the medial portion 31 of which provides the bearing seat for the axle 12.

Carried by the bearing plate 30 are guide bolts 32 arranged on opposite sides of the axle 12, as shown in Fig. 3. These guide bolts 32 project through aligned elongated slots 33 formed in the side bar 28 on which the cap 30 is mounted.

Preferably adjacent to the adjustable bearings 29 of the axle 12 and secured thereto in any suitable manner are tension springs 35. The opposite end portions of these tension springs 35 are secured as at 36 to a brake bar 37 of the carriage, there being suitable mechanism (not shown) for operating this brake bar 37. Such brake-bar operating mechanism is not shown as it constitutes no part of this invention, and in this connection the springs 35 may be fixed to lateral extensions (not shown) provided by the chassis side bars 28, if desired.

The arrangement is such that free rocking and springing movement is permitted the carriage body 18. When a weight is disposed upon the carriage body 18, be it that of the occupant or the operator leaning upon the body 18, such weight will be compensated for by the self-adjusting axle 12, which is brought about by virtue of the self-adjusting bearings 29 under the control of the springs 35, which springs 35 permit the various parts to assume their normal position when the weight is not disposed upon the carriage body.

In this manner all undue stress or pressure is transmitted directly to the axle structure 12, and due to the self-adjusting feature of this axle structure, this stress or pressure is diverted from the scissors bars 15 and the chassis side bars 28 and such other parts as generally receive the ill effects of this undue stress or pressure. Consequently, the carriage remains more durable, the interconnecting parts thereof maintain their neat and accurate fitting, eliminating looseness which would otherwise result when no structure is provided for compensating for the weight or additional weight imposed on these parts.

While we have shown the bearings for the axle 11 as being fixed to the side chassis bars 28, it is manifest that these bearings may be of a structure the same as the bearings for the axle 12.

It will be seen that the structure is simple in nature and can be manufactured at an economical cost and affords great pleasure both to the occupant and operator of the carriage.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. A baby carriage comprising a folding body structure and a chassis structure including opposite parallel spaced chassis side bars, a wheel-bearing axle arranged transversely with respect to the side bars, shackle means on said axle and connected to said folding body structure to transmit a load applied thereto to said axle, adjustable bearing members for operatively connecting the axle to said side bars and adapted to move relative to the latter when a load is applied as aforesaid, and means controlling the adjustment of said bearing members commensurate with said load, said means comprising spring members having corresponding end portions connected to the axle and opposite corresponding end portions connected to members of said chassis structure.

2. In a baby carriage having a collapsible body structure and a chassis comprising a pair of side bars, a wheel bearing axle spanning said side bars and carrying shackle members connected to said collapsible body structure, for transmitting weight applied to said collapsible body structure to said wheel bearing axles, the combination of means for compensating for increased weight applied to said collapsible body structure said means comprising slot formations in said side bars, bearing members for said wheel bearing axle, means movable in said slots for slidably connecting said bearing members to said side bars, and spring means for resisting the sliding movement of said bearing members when weight is applied as aforesaid.

3. In a baby carriage having a collapsible body structure and a chassis comprising a pair of side bars, a wheel bearing axle spanning said side bars and carrying shackle members connected to said collapsible body structure, for transmitting weight applied to said collapsible body structure to said wheel bearing axles, the combination of means for compensating for increased weight applied to said collapsible body structure said means comprising slot formations in said side bars, bearing members for said wheel bearing axle, means movable in said slots for slidably connecting said bearing members to said side bars, and spring means for resisting the sliding movement of said bearing members when weight is applied as aforesaid, said spring means having corresponding end portions connected to said axle and opposite corresponding end portions connected to said chassis side bars.

SAMUEL KROLL.
NATHAN J. KROLL.